(12) United States Patent
Hanson

(10) Patent No.: US 9,368,107 B2
(45) Date of Patent: Jun. 14, 2016

(54) PERMITTING AUTOMATED SPEECH COMMAND DISCOVERY VIA MANUAL EVENT TO COMMAND MAPPING

(75) Inventor: Gary R. Hanson, Boynton Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 773 days.

(21) Appl. No.: 13/090,397

(22) Filed: Apr. 20, 2011

(65) Prior Publication Data

US 2012/0271639 A1 Oct. 25, 2012

(51) Int. Cl.
*G10L 15/20* (2006.01)
*G10L 15/06* (2013.01)
*G10L 15/22* (2006.01)

(52) U.S. Cl.
CPC .......... *G10L 15/06* (2013.01); *G10L 2015/228* (2013.01)

(58) Field of Classification Search
CPC ....... G10L 15/265; G10L 15/22; G10L 15/30; G06F 3/16; H04M 2201/40
USPC .......................................................... 704/275
See application file for complete search history.

(56) References Cited

U.S. PATENT DOCUMENTS

| | | | | |
|---|---|---|---|---|
| 5,199,080 A * | 3/1993 | Kimura et al. | ................ | 381/110 |
| 5,396,542 A * | 3/1995 | Alger et al. | ................... | 379/67.1 |
| 6,230,132 B1 * | 5/2001 | Class et al. | ..................... | 704/270 |
| 6,253,176 B1 * | 6/2001 | Janek | ...................... | G10L 15/22 704/10 |
| 6,532,447 B1 * | 3/2003 | Christensson | ................. | 704/275 |
| 6,584,439 B1 * | 6/2003 | Geilhufe et al. | .............. | 704/270 |
| 6,654,720 B1 * | 11/2003 | Graham et al. | ............... | 704/270 |
| 6,762,692 B1 * | 7/2004 | Mingot et al. | .............. | 340/12.54 |
| 6,839,670 B1 * | 1/2005 | Stammler et al. | ............. | 704/251 |
| 7,146,381 B1 * | 12/2006 | Allen | .................. | G06F 17/2705 |
| 7,379,876 B2 * | 5/2008 | Nakata | .......................... | 704/275 |
| 7,389,235 B2 * | 6/2008 | Dvorak | ......................... | 704/275 |
| 7,457,755 B2 * | 11/2008 | Konig | ........................... | 704/275 |
| 7,676,370 B2 * | 3/2010 | Tanaka | .......................... | 704/270 |
| 7,698,142 B2 * | 4/2010 | Washburn | ................ | A61B 8/13 704/231 |
| 7,962,268 B2 * | 6/2011 | Cho | ............................... | 701/51 |
| 8,125,405 B2 * | 2/2012 | Dove et al. | ........................ | 345/7 |
| 8,296,151 B2 * | 10/2012 | Klein et al. | .................... | 704/275 |
| 8,380,499 B2 * | 2/2013 | Spaulding et al. | ............ | 704/231 |
| 8,412,531 B2 * | 4/2013 | Sullivan et al. | ................ | 704/275 |
| 8,538,756 B2 * | 9/2013 | Fujii et al. | ...................... | 704/246 |

(Continued)

OTHER PUBLICATIONS

Thompson, et al.; "Associating Spoken Command with Multiple Human Users in a Dynamic Environment"; INSPEC/IEEE; 2008.

(Continued)

*Primary Examiner* — Fariba Sirjani
(74) *Attorney, Agent, or Firm* — Hamilton, Brook, Smith & Reynolds, P.C.

(57) ABSTRACT

An input from a manually initiated action within a computing system can be received. The system can be associated with a speech component. The input can be associated with a system function. The function can be an operation within the computing system and can be linked to a function identifier. The identifier can be translated to a command data. The command data can be associated with a command identifier, a command, and an alternative command. The command data can be a speech command registered within the speech component. The command data can be presented within a speech interface responsive to the translating. The speech interface can be associated with the speech component.

24 Claims, 2 Drawing Sheets

(56) References Cited

U.S. PATENT DOCUMENTS

| | | | | |
|---|---|---|---|---|
| 8,600,763 | B2* | 12/2013 | Brush et al. | 704/275 |
| 8,674,939 | B2* | 3/2014 | Gustafsson et al. | 345/156 |
| 2002/0062216 | A1* | 5/2002 | Guenther et al. | 704/270.1 |
| 2002/0087655 | A1* | 7/2002 | Bridgman et al. | 709/217 |
| 2002/0143874 | A1* | 10/2002 | Marquette et al. | 709/204 |
| 2003/0014251 | A1* | 1/2003 | Pokhariyal et al. | 704/251 |
| 2003/0018474 | A1* | 1/2003 | Chavan | 704/270 |
| 2003/0074199 | A1* | 4/2003 | Kuzunuki | G10L 15/22 704/270.1 |
| 2004/0260562 | A1* | 12/2004 | Kujirai | G01C 21/3608 704/275 |
| 2006/0047362 | A1* | 3/2006 | Aoyama et al. | 700/245 |
| 2006/0136914 | A1* | 6/2006 | Marascio | G06F 11/3664 718/100 |
| 2007/0005359 | A1* | 1/2007 | Bowen | G06Q 40/02 704/251 |
| 2007/0208555 | A1* | 9/2007 | Blass et al. | 704/9 |
| 2007/0265866 | A1* | 11/2007 | Fehling et al. | 705/1 |
| 2007/0274233 | A1* | 11/2007 | Ptashek et al. | 370/254 |
| 2008/0252595 | A1* | 10/2008 | Boillot | 345/156 |
| 2009/0055178 | A1* | 2/2009 | Coon | 704/246 |
| 2009/0076821 | A1* | 3/2009 | Brenner | G06F 17/30053 704/260 |
| 2009/0273563 | A1* | 11/2009 | Pryor | 345/157 |
| 2010/0013760 | A1* | 1/2010 | Hirai | G10L 15/22 345/156 |
| 2010/0207875 | A1* | 8/2010 | Yeh | 345/156 |
| 2010/0207881 | A1* | 8/2010 | Miller | 345/158 |
| 2010/0330975 | A1* | 12/2010 | Basir | H04L 67/12 455/418 |
| 2011/0022393 | A1* | 1/2011 | Waller et al. | 704/270 |
| 2011/0301958 | A1* | 12/2011 | Brush | G10L 15/22 704/275 |
| 2012/0197637 | A1* | 8/2012 | Gratke et al. | 704/226 |
| 2013/0166305 | A1* | 6/2013 | Spaulding et al. | 704/275 |
| 2013/0179174 | A1* | 7/2013 | Comerford et al. | 704/275 |
| 2013/0211710 | A1* | 8/2013 | Kennewick et al. | 701/419 |
| 2013/0211835 | A1* | 8/2013 | Larri et al. | 704/243 |
| 2013/0253929 | A1* | 9/2013 | Weider et al. | 704/235 |
| 2013/0268274 | A1* | 10/2013 | Williams | 704/251 |

OTHER PUBLICATIONS

Leung, et al.; "Recognition of Speech Commands Using a Modified Neural Fuzzy Network and an Improved GA"; Google; 2003.

Novotny, et al.; "Analysis and Optimization of Telephone Speech Command Recognition System Performance in Noisy Environment"; Google; Apr. 2004.

Ratzka, A.; "Explorative Studies on Multimodal Interaction in a PDA-and Desktop-based Scenario"; Google; Oct. 2008.

* cited by examiner

PERMITTING AUTOMATED SPEECH COMMAND DISCOVERY VIA MANUAL EVENT TO COMMAND MAPPING

BACKGROUND

The present invention relates to the field of speech user interfaces.

Applications which utilize a speech interface operate via speech recognition to identify a speech (e.g., spoken) command. Spoken commands must utilize one or more correct phrases in order to actuate a function provided by the application. For example, to close a vehicle window within a speech enabled automobile, phrases such as "Raise the window" or "Roll-up the window" can be equivalent, resulting in the closing of the window. In almost all cases, however, speech commands and/or phrases must be discovered by trial and error, by referring to a list provided, or in an off-line manual (e.g., vehicle manual).

These solutions fail to fully utilize the speech interface functionality to address the discovery of commands. Provided lists can be organized into task domains, which do not permit easy identification of a specific command readily. For instance, to manually discover a tune station speech command, a user must select "Radio Control" task domain, select "Mode Management", then select "Tuning" to discover the appropriate speech command. Further, many functions can be associated with a single speech command. Consequently, identifying an appropriate speech command to utilize can be troublesome in many scenarios. For example, within an automobile, traditional manual speech command discovery can result in safety issues by distracting a driver from maintaining road awareness.

BRIEF SUMMARY

One aspect of the present invention can include a system, an apparatus, a computer program product, and a method for permitting automated speech command discovery via manual event to command mapping. An input from a manually initiated action within a computing system can be received. The system can be associated with a speech component. The input can be associated with a system function. The function can be an operation within the computing system and can be linked to a function identifier. The identifier can be translated to a command data. The command data can be associated with a command identifier, a command, and an alternative command. The command data can be a speech command registered within the speech component. The command data can be presented within a speech interface responsive to the translating. The speech interface can be associated with the speech component.

Another aspect of the present invention can include a method, an apparatus, a computer program product, and a system for permitting automated speech command discovery via manual event to command mapping. A discovery engine can be configured to present a speech command responsive to a manually initiated action detected by a computing system. The manually initiated action can be linked to a function within the computing system. The function can be an operation within the computing system associated with a function identifier. The computing system can be associated with a speech component. A data store can be able to persist a command mapping associated with the speech component. The mapping can link the function identifier with a command data. The command data can include a command identifier, a command, and an alternative command.

DETAILED DESCRIPTION

Figure 1:
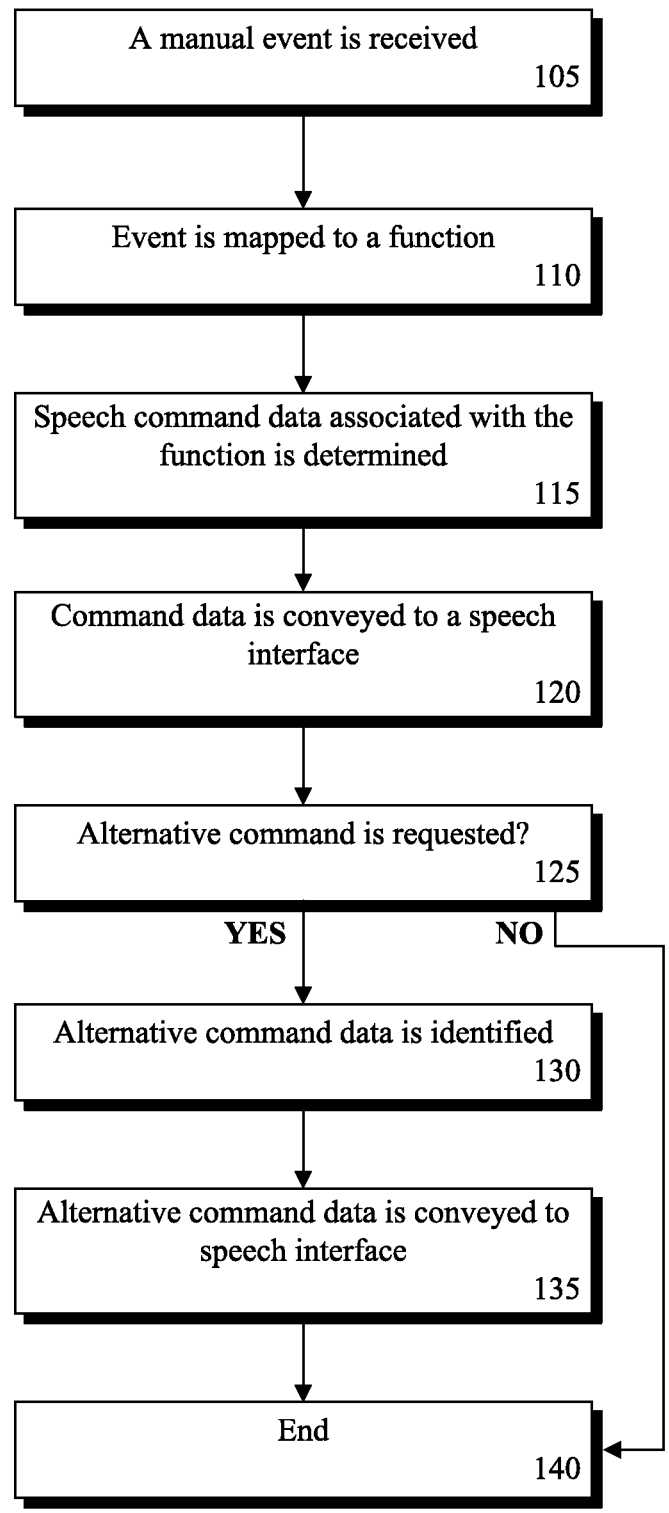
FIG. 1 is a flowchart illustrating a method for permitting automated speech command discovery via manual event to command mapping in accordance with an embodiment of the inventive arrangements disclosed herein.

The present disclosure is a solution for permitting automated speech command discovery via manual event to function mapping. In the solution, a manual event (e.g., manually performed operation) within a computing system can be mapped to a function within a speech interface. The mapping can trigger speech command discovery via one or more customizable rulesets. The rulesets can permit discovery using a grammar tree, utterance length, text strings, and the like. In one embodiment, the disclosure can be present within an automobile allowing rapid discovery of speech commands without requiring manual discovery. In the embodiment, driver actions can trigger speech command presentation. For instance, when a driver adjusts the air conditioning temperature manually, a speech interface of the automobile can announce "You could have said 'increase temperature one degree' to adjust the air conditioning".

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart illustrating a method 100 for permitting automated speech command discovery via manual event to command mapping in accordance with an embodiment of the inventive arrangements disclosed herein. In method 100, a manual event can be linked to a speech command to permit rapid and automated speech command discovery associated with a speech-enabled computing system. As used herein, a manual event can be a system operation which can be performed without the use of a speech command. Speech command can be a spoken entity permitting the execution of a system operation. Speech command can include, but is not limited to, a word, a phrase, and the like. For example, a user can speak a command to lock a door by uttering "Lock doors". It should be appreciated that the speech command is presented proximate to a human agent interacting with the computing system and vice-versa.

In one embodiment, the computing system can be an in-vehicle communications and/or entertainment system. In the embodiment, an operation can be linked to a speech command which can be easily discovered when the operation is manually performed. Operations can include, but is not limited to, telephone calls, audio control, vehicle functionality adjustments, and the like. For example, when a user opens a car window via toggling an electronic power window switch, a speech interface can audibly present an appropriate voice activated command to the user.

Speech-enabled computing system can include a conventional and/or non-conventional computing system associated with a speech interface. Speech interface can be a user interactive interface able to present a speech command responsive to a manual event. Speech interface can include, a loudspeaker, a microphone, a visual display, a user input device (e.g., interactive buttons), and the like. The speech interface can be a user interface which can include, but is not limited to, a graphical user interface (GUI), voice user interface (VUI), a mixed-mode interface, a text-based interface, and the like. In one embodiment, computing system can be associated with a speech-enabled application. In the embodiment, application can utilize disclosure functionality to allow speech command discovery of application operations.

In step 105, a manual event can be received by the speech-enabled computing system. The manual event can be a manually initiated action including, but not limited to, interaction with a physical component of the speech-enabled computing system, interaction with a digital element of the speech-enabled computing system, and the like. For instance, the manual event can be physically tuning a radio station utilizing a tuning knob on a head unit.

In step 110, an event can be mapped to a function within the computing system. Function can be mapped to the event using a command mapping. Command mapping can link a system function to a speech command which can automatically trigger the execution of the function. Command mapping can include, but is not limited to, a system component identifier, a function identifier, command identifier, a command, an alternative command, and the like. Command mapping can be manually and/or automatically generated. In one instance, command mapping can be generated during runtime. In the instance, user customizable phrases can be present within the command mapping. That is, the disclosure can adapt to user customizations.

In step 115, a speech command data associated with the function can be determined within the speech-enabled computing system. In one instance, the speech command data can be a portion of the command mapping. In another instance, the speech command data can be a portion of an externally linked resource. In the embodiment, the externally linked resource can be a non-native speech database allowing. For example, the speech database can assist non-native speakers to verbally reiterate the command. In step 120, command data can be conveyed to a speech interface. The command data can be communicated via one or more networks communicatively linking the speech-enabled computing system to the speech interface. In one embodiment, the speech command can be visually presented within an interface visible to a user. In another embodiment, the speech command can be audibly presented within a speech interface proximate a user. In the embodiment, the speech command can be enunciated permitting the user to be assisted in learning the command pronunciation.

In step 125, if an alternative command is requested, the method can continue to step 130, else proceed to step 140. The request can be received via the speech interface and/or an interface associated with the speech-enabled computing system. In step 130, an alternative command data can be identified. The alternative command data can be identified utilizing command mapping and/or an alternative command resource (e.g., synonym list). In step 135, the alternative command data can be conveyed to the speech interface of the speech-enabled computing system. In step 140, the method can end.

Speech-enabled computing system can include one or more computing devices capable of speech recognition. Computing system can include, but is not limited to hardware, software, firmware, and the like. Hardware can include, but is not limited to, computing devices communicatively linked together. Computing devices can include, but is not limited to, a laptop, a mobile phone, a portable digital assistant (PDA), a tablet computing device, a portable media player, a car-puter, and the like. Computing system can be an operating system, a collection of applications, and the like. Computing system can include, but is not limited to, a vehicle control system, a Global Navigation System (GPS) navigation system, a communication system, an entertainment system, a domotic system (e.g., home automation), a robotic computing system, a personal computing system, and the like.

Drawings presented herein are for illustrative purposes only and should not be construed to limit the invention in any regard. Method 100 can be performed for each manually initiated action associated with a component of the computing system. Method 100 can be associated with one or more software applications including, but not limited to, data entry applications, word processing software, hands-free computing software, and the like. It should be understood that method 100 can be performed in real-time and/or near real-time.

Figure 2:
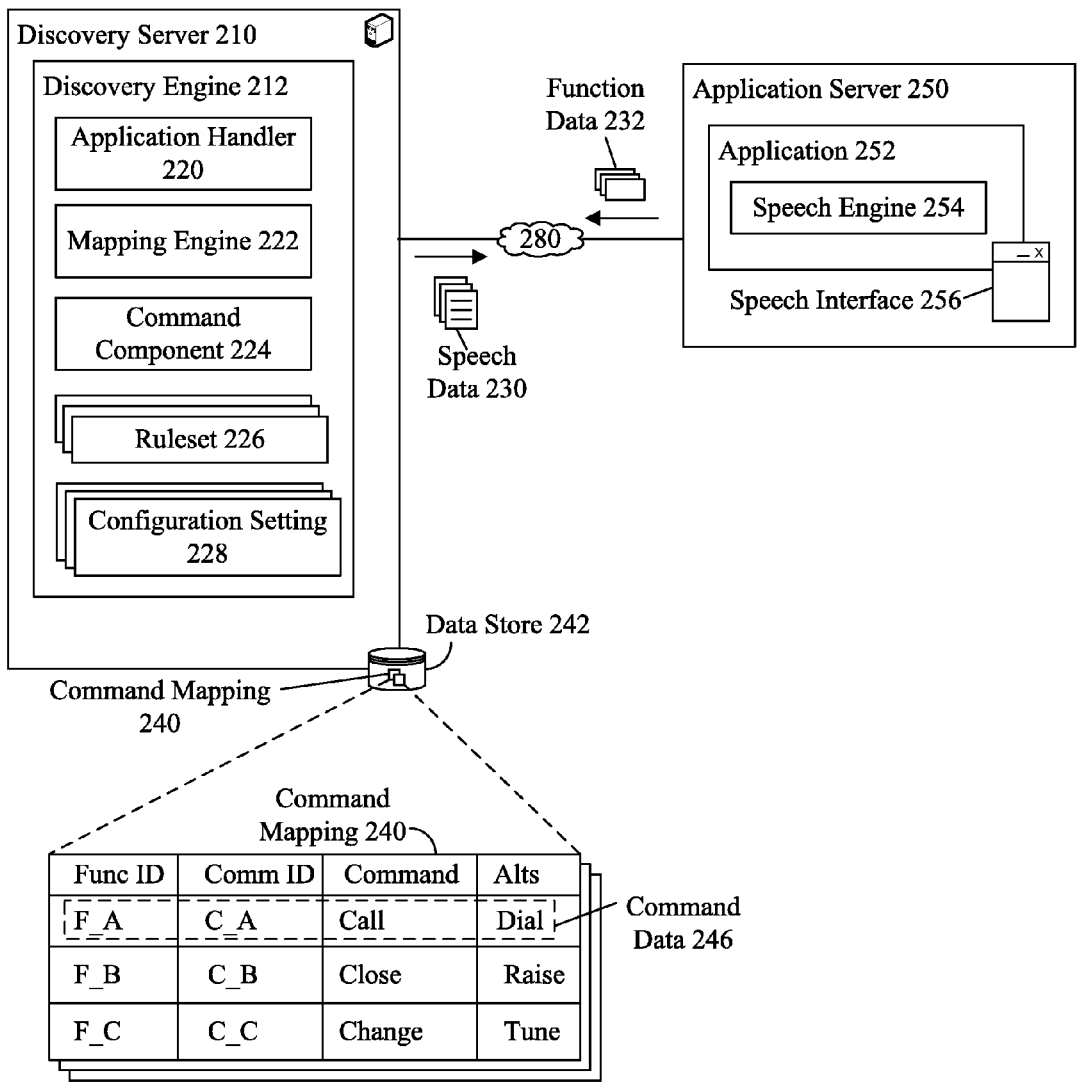
FIG. 2 is a schematic diagram illustrating a system for permitting automated speech command discovery via manual event to command mapping in accordance with an embodiment of the inventive arrangements disclosed herein.

FIG. 2 is a schematic diagram illustrating a system 200 for permitting automated speech command discovery via manual operation to command mapping in accordance with an embodiment of the inventive arrangements disclosed herein. System 200 can be present in the context of method 100. In system 200, a discovery server 210 can be communicatively linked with an application server 250 via network 280. Discovery server 210 can permit automated discovery of speech commands associated with application 252 and/or speech interface 256. Function data 232 associated with a manual event can be received from application server 250 and can be processed to identify a speech command data 246. Command data 246 can include a speech command associated with the manual event. The command data 246 can be conveyed as speech data 230 which can be processed to determine a relevant speech command to be presented via speech interface 256. For example, when a user changes a compact disc track via pressing a fast forward interface button, a speech command can be presented enabling the action to be subsequently performed via voice activation.

In one embodiment, engine 212 can be a component of a home automation system allowing reduced learning curves for voice controls. In another embodiment, engine 212 can be a component of a communication system allowing call termination and management speech commands to be presented. In yet another embodiment, engine 212 can be a component of a mobile phone computing device, enabling multiple software applications to leverage engine 212 functionality.

Function data 232 can be one or more data sets associated with application 252 indicating an operation within the application which is linked to a manual event. Function data 232 can include, but is not limited to, function identifier, function description, function values, and the like. Function identifier can include, but is not limited to, numeric values, alphanumeric values, and the like. In one instance, data 232 can be encrypted to protect application 252 infrastructure and/or data.

Speech data 230 can be one or more entities for identifying a speech command linked to an application function triggered by a manual event. Data 230 can include, but is not limited to, function information, speech synthesis information, and the like. Speech synthesis information can include, but is not limited to, linguistic analysis information, wave form data, and the like.

Discovery server 210 can be a hardware/software component for enabling automated discovery of speech commands in response to a manual event. Server 210 can include, but is not limited to, engine 212, data store 242, and the like. Server 210 can be a component of a speech recognition entity. In one embodiment, discovery server 210 can be a component of an IBM WEBSPHERE middleware. In another embodiment, server 210 functionality can be a portion of a Web-enabled service. In yet another embodiment, server 210 functionality can be a portion of an application programming interface (API).

Discovery engine 212 can be a hardware/software entity for receiving function data 232 and/or identifying speech data 230. Engine 212 can include, but is not limited to, application handler 220, mapping engine 222, command component 224, ruleset 226, configuration settings 228, and the like. In one instance, engine 212 can be utilized during a software development cycle, permitting verification and quality assurance policies to be enforced. In one configuration of the instance, engine 212 can be used to verify ruleset 226 can be applied appropriately. In another configuration of the instance, engine 212 can be utilized to generate command mapping 240 prior to runtime. In yet another configuration, engine 212 can be employed to verify annotations within speech data 230 exist within grammars specified within application 252.

Application handler 220 can be a hardware/software component for registering applications within engine 212. Application handler 220 can utilize an application registry (not shown) to process application requests and/or function identifiers. Handler 220 can be configured to receive traditional and/or proprietary formats associated with function data 232. In one instance, handler 220 can utilize unique application identifiers to track application requests triggered from a manual event.

Command component 224 can be a hardware/software component for identifying and/or conveying a relevant speech command responsive to a manual event occurring within the system 200. Component 224 can utilize command mapping 240 to transmit an appropriate speech command to application 252. A function identifier obtained from an application request (e.g., function data 232) can be mapped to a command data. For example, in command data 246, a function associated with identifier F_A can be linked to a "Call" command and an alternative command "Dial".

Ruleset 226 can be one or more criteria for determining an appropriate mapping utilizing mapping 240. Ruleset 226 can conform to one or more traditional and/or proprietary formats including, but not limited to, Backus-Naur Form (BNF), JAVA Speech Grammar Format (JSGF), and the like. Ruleset 226 can be utilized during a software development cycle and/or during runtime of system 200. In one instance, ruleset 226 can be utilized to generate mapping 240. In one embodiment, ruleset 226 can include rules for determining phrases including, but not limited to, a phrase most likely to occur, the first phrase of a grammar, shortest phrase, and the like.

Configuration setting 228 can be one or more options for establishing the behavior of server 210 and/or system 200. Setting 228 can include, but is not limited to, server 210 settings, engine 212 options, application hander 220 parameters, mapping engine 222 settings, command component 224 options, and the like. In one instance, setting 228 can be dynamically altered permitting flexible runtime configuration of system 200. In one embodiment, setting 228 can be heuristically determined from historic settings, user preferences, application settings, and the like.

Data store 242 can be a hardware/software component for storing command mapping 240. Data store 242 can include, but is not limited to, a Storage Area Network (SAN), Network Attached Storage (NAS), and the like. Data store 242 can be a component of a Relational Database Management System (RDBMS), Object Oriented Database Management System, and the like. Data store 242 can be communicatively linked to discovery server 210 via one or more networks.

Command mapping 240 can be a data set permitting associating of a manual event with a speech command within an application 252. It should be appreciated that mapping 240 is not limited to exemplary data set presented herein. In one embodiment, mapping 240 can be dynamically altered during runtime. Mapping 240 can support arbitrary quantity of commands, synonyms, and/or alternative commands for a function. In one embodiment, mapping 240 can be dynamically generated from an existing speech recognition software development kit (SDK). It should be understood that mapping 240 can exist for each application and/or function set.

Application server 250 can be a hardware/software component for executing an application 252. Application server 250 can include, but is not limited to, application 252, application settings (not shown), and the like. Server 250 functionality can include, but is not limited to, speech recognition, communications functionality, brokering, and the like. In one instance, server 250 can be an IBM WEBSPHERE middleware. In one instance, server 250 can be a software service executing application 252 (e.g., application thread).

Application 252 can be a speech-enabled software component for automating a manual operation utilizing a speech command. Application 252 can include, but is not limited to speech engine 254, speech interface 256, application settings (not shown), and the like. Application 252 can receive input from a manual event which can trigger the communication of function data 232 to server 210. Function data 232 can include function identifier and relevant function data allowing server 210 to complete an event to speech command mapping. Application 252 can include, but is not limited to, a desktop application, a mobile computing application, a firmware program, and the like. For example, application 252 can be a speech program of a household appliance.

Speech engine 254 can be a hardware/software speech processing component within application 252. Speech engine 254 can include one or more speech processing algorithms including, but not limited to, phonetic algorithms, keyword spotting algorithms, large-vocabulary, continuous speech recognition algorithms, and the like. Speech engine 254 functionality can include, but is not limited to, speech recognition, text-to-speech, speech-to-text, speech synthesis, speech enhancement, and the like.

Speech interface 256 can include, but is not limited to, a traditional speech interface, a proprietary speech interfaces, silent speech interface, and the like. In one instance, speech interface 256 can include multiple distributed components. In the instance, engine 212 can intelligently direct speech command presentation to an appropriate component. For instance, when a passenger within a vehicle initiates a manual operation, engine 212 can utilize a speech interface component (e.g., loudspeaker) proximate to the passenger to present speech command vocalization.

Drawings presented herein are for illustrative purposes only and should not be construed to limit the invention in any regard. System 200 can be a networked computing environment, distributed computing environment, cloud computing environment, and the like. System 200 can utilize one or more conventional and/or non-conventional computing conventions including, but not limited to, Extensible Markup Language (XML), Extensible Hypertext Markup Language (XHTML), and the like. It should be appreciated that server 210 and/or engine 212 can represent one embodiment of the disclosure. In one configuration of the embodiment, server 210 can be a "drop-in" solution able to extend the functionality of an existing speech-enabled system. For example, server 210 can be communicatively linked with an Interactive Voice Response system permitting command discovery to be achieved.

The flowchart and block diagrams in the FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for discovering speech recognition commands, the method being carried out in a system comprising of a computing system in communication with a discovery server through an application server, the method, at the computing system, comprising:

in response to detecting a manually initiated action, automatically responding with voice command discovery by presenting speech command data configured to facilitate initiation of the action via speech, such that the presentation of the speech command data directs a user to use the speech command data to initiate the action without manual intervention, the automatically responding with voice command discovery including:
receiving at an application an input from the manually initiated action,
wherein the computing system is associated with a speech component, wherein the input is associated with a computing system function, and
wherein the computing system function is an operation within the computing system and is linked to a function identifier, the function identifier being associated with the manually initiated action in the context of the application;
transmitting a request containing the function identifier through the application server to the discovery server, the discovery server configured with a mapping of function identifiers linked to respective speech command data, wherein the discovery server determines the application based on an application identifier derived from the manually initiated action, and
wherein the discovery server translates the function identifier contained in the request to the speech command data by using the function identifier contained in the request associated with the application to find in the mapping a corresponding function identifier linked to the speech command data;
receiving from the discovery server through the application server the speech command data,
wherein the speech command data is associated with a command identifier and a command, and
wherein the speech command data is a speech command registered within the speech component; and
presenting the received speech command data within a speech interface of the speech component.

2. The method of claim 1, wherein the presenting comprises enunciating the command associated with the speech command data, wherein the command is at least one of a word and a phrase.

3. The method of claim 1, wherein the presenting includes presenting an alternative command within the speech interface, the alternative command associated with the speech command data.

4. The method of claim 1, wherein the receiving, translating, and presenting is performed in real-time.

5. The method of claim 1, wherein the translating is associated with a customizable ruleset.

6. The method of claim 5, wherein the ruleset comprises of a plurality of speech language formats.

7. The method of claim 1, wherein the computing system is associated with a vehicle computing system within a vehicle.

8. The method of claim 1, wherein the function identifier is at least one of a numeric value and an alphanumeric value.

9. A computer program product for discovering speech recognition commands, the computer program product comprising: computer usable program code stored in a tangible non-transitory storage medium, said computer usable program code, when loaded and executed by a processor of a computing system in communication with a discovery server through an application server, causes the computing system to:
detect a manually initiated action in which a user initiates the action manually without using speech recognition to cause initiation of the action;
receive at an application an input from the manually initiated action within the computing system,
wherein the computing system is associated with a speech component,
wherein the input is associated with a computing system function,
wherein the computing system function is an operation within the computing system and is linked to a function identifier, the function identifier being associated with the manually initiated action in the context of the application;
transmit a request containing the function identifier to through the application server to the discovery server, the discovery server configured with a mapping of function identifiers linked to respective speech command data,
wherein the discovery server determines the application based on an application identifier derived from the manually initiated action, and
wherein the discovery server translates the function identifier contained in the request to the speech command data by using the function identifier contained in the request associated with the application to find in the mapping a corresponding function identifier linked to the speech command data;
receive from the discovery server through the application server the speech command data,
wherein the speech command data is associated with a command identifier and a command, and
wherein the speech command data is a speech command registered within the speech component, the speech command data being configured to facilitate initiation of the action via speech; and
present the received speech command data within a speech interface of the speech component, such that the presentation of the speech command data directs the user to use the speech command data to initiate the action without manual intervention.

10. The computer program product of claim 9, wherein the computer usable program code causes the apparatus to enunciate the command associated with the command data, wherein the command is at least one of a word and a phrase.

11. The computer program product of claim 9, wherein the computer program usable code is associated with a vehicle computing system within a vehicle.

12. The computer program product of claim 9, wherein the computer program product is middleware.

13. The computer program product of claim 9, wherein the function identifier is at least one of a numeric value and an alphanumeric value.

14. A computing system for discovering speech recognition commands comprising a processor, a memory, and a bus linking the processor and memory, wherein said processor is able execute instructions of at least one computer program product that is stored in a non-transitory storage medium, wherein execution of the instructions causes the computing system to:
automatically respond to a manually initiated action with voice command discovery by presenting speech command data configured to facilitate initiation of the action via speech, such that the presentation of the speech command data directs the user to use the speech command to initiate the action without manual intervention, wherein the computing system in communication with a discovery server through an application server, and wherein the automatically responding with voice command discovery causing the computing system to:
receive at an application an input from a manually initiated action,
wherein the computing system is associated with a speech component,
wherein the input is associated with a computing system function, and
wherein the computing system function is an operation within the computing system and is linked to a function identifier, the function identifier being associated with the manually initiated action in the context of the application;

transmit a request containing the function identifier through the application server to the discovery server, the discovery server configured with a mapping of function identifiers linked to respective speech command data, wherein the discovery server determines the application based on an application identifier derived from the manually initiated action, and wherein the discovery server translates the function identifier contained in the request to the speech command data by using the function identifier contained in the request associated with the application to find in the mapping a corresponding function identifier linked to the speech command data;

receive from the discovery server through the application server the speech command data, wherein the command data is associated with a command identifier and a command, and wherein the speech command data is a speech command registered within the speech component; and present the received speech command data within a speech interface of the speech component responsive to the translating.

15. The system of claim 14, wherein the presenting comprises enunciating the command associated with the command data, wherein the command is at least one of a word and a phrase.

16. The system of claim 14, wherein the presenting includes presenting an alternative command within the speech interface, the alternative command associated with the speech command data.

17. The system of claim 14, further comprising:

a discovery engine configured to present the command data within the speech user interface responsive to the manually initiated action, wherein the manually initiated action is linked to the system function; and a data store able to persist a command mapping associated with the speech component, wherein the mapping links the function identifier with the command data.

18. The system of claim 14, further comprising:

an application handler able to register a speech-enabled application and configured to receive the function identifier from the speech-enabled application;

a mapping engine configured to identify the command data linked to the function identifier, wherein the command data triggers the function of the computing system; and a command component able to convey the command data to at least one of a speech interface associated with the speech component and an application.

19. The system of claim 14, wherein the discovery server comprises:

a voice command discovery engine configured to present the speech command data responsive to the manually initiated action detected by the computing system, wherein the speech command data presented, if enunciated, causes the action to be initiated electronically automatically without manual intervention, and wherein the voice command discovery engine presents the speech command data in response to receiving the request containing the function identifier; and a data store able to persist the mapping associated with the speech component, such that the data store enables the function identifier contained in the request to be used to find in the mapping the function identifier linked with the speech command data.

20. The system of claim 19, wherein the discovery server further comprises:

an application handler able to register a speech-enabled application and configured to receive the function identifier from the speech-enabled application;

a mapping engine configured to identify the command data linked to the function identifier, wherein the command data triggers the function of the computing system; and a command component able to convey the command data to at least one of a the speech interface associated with the speech component and the speech-enabled application.

21. The system of claim 19, wherein the voice command discovery engine is configured to verify a ruleset associated with the mapping.

22. The system of claim 19, wherein the voice command discovery engine is able to verify grammars associated with an application linked with the computing system.

23. The system of claim 19, wherein the voice command discovery engine is configured to generate a pre-compiled mapping during a software development cycle.

24. The system of claim 19, wherein the voice command discovery engine is associated with a vehicle computing system within a vehicle.

* * * * *